US011657365B2

(12) United States Patent
Santangeli et al.

(10) Patent No.: US 11,657,365 B2
(45) Date of Patent: *May 23, 2023

(54) SECURED PARCEL LOCKER SYSTEM WITH IMPROVED SECURITY

(71) Applicant: QUADIENT TECHNOLOGIES FRANCE, Bagneux (FR)

(72) Inventors: Gabriel Santangeli, Savigny-sur-Orge (FR); Thomas Eraud, Avignon (FR); Arnaud Yvoz, Taillades (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 653 days.

This patent is subject to a terminal disclaimer.

(21) Appl. No.: 16/717,599

(22) Filed: Dec. 17, 2019

(65) Prior Publication Data

US 2020/0193375 A1 Jun. 18, 2020

(30) Foreign Application Priority Data

Dec. 18, 2018 (EP) .................................... 18306731

(51) Int. Cl.
 *G06Q 10/0836* (2023.01)
 *H04W 4/80* (2018.01)
 (Continued)

(52) U.S. Cl.
 CPC ....... *G06Q 10/0836* (2013.01); *H04L 9/0825* (2013.01); *H04L 9/0861* (2013.01);
 (Continued)

(58) Field of Classification Search
 None
 See application file for complete search history.

(56) References Cited

U.S. PATENT DOCUMENTS

| 9,853,969 | B2 * | 12/2017 | Enke | ................ H04W 4/80 |
| 9,985,992 | B1 * | 5/2018 | Luce, Jr. | ............. H04L 63/10 |

(Continued)

FOREIGN PATENT DOCUMENTS

| EP | 1494407 A1 * | 1/2005 | .......... H04L 1/1685 |
| EP | 3306577 A1 | 4/2018 | |

(Continued)

OTHER PUBLICATIONS

S. Ze-hong and Z. Guang-yuan, "Multi-functional Parcel Delivery Locker system," 2015 International Conference on Computer and Computational Sciences (ICCCS), 2015, pp. 207-210, doi: 10.1109/ICCACS.2015.7361351. (Year: 2015).*

(Continued)

*Primary Examiner* — Jacob C. Coppola
(74) *Attorney, Agent, or Firm* — Cozen O'Connor

(57) ABSTRACT

A method and a system for operating an electronic locker system for parcel deposit and pick-up via a network of at least one mobile device, the system comprising: a remote shipping system communicating via a long distance communication network with the at least one mobile device, at least one parcel locker constituted of at least one autonomous compartments cluster including at least one compartment equipped with a door and including a locking module, which controls locking and unlocking of the door and communicates locally with the at least one mobile device via a short distance communication, and comprising an energy management module configured for managing transitions of energy modes and allowing the at least one autonomous compartments cluster to be run in a sleep mode; the method comprising: establishing a communication between the at least one mobile device and the remote shipping system, regularly emitting by the locking module, while in the sleep mode, a broadcasted short message addressed to the at least (Continued)

one mobile device for establishing a short distance communication session with the at least one mobile device, receiving by the at least one mobile device from the remote shipping system an authenticator generated by the remote shipping system and provided in a ciphered form to said at least one mobile device, this authenticator being used for sending by the at least one mobile device to the locking module a request including the authenticator, and deciphering with a secret key stored in the locking module the authenticator for an automatic validation of the request, wherein no authorization code is generated and provided to the locking module for the automatic validation of the request.

9 Claims, 6 Drawing Sheets

(51) Int. Cl.
  *H04W 76/10* (2018.01)
  *H04L 9/08* (2006.01)
  *H04W 12/041* (2021.01)
  *H04W 12/06* (2021.01)

(52) U.S. Cl.
  CPC ............. *H04L 9/0894* (2013.01); *H04W 4/80* (2018.02); *H04W 12/041* (2021.01); *H04W 12/068* (2021.01); *H04W 76/10* (2018.02); *G06Q 2220/00* (2013.01)

(56) References Cited

U.S. PATENT DOCUMENTS

| | | | | |
|---|---|---|---|---|
| 10,909,790 | B2* | 2/2021 | Jansen | G06Q 20/0855 |
| 11,170,339 | B2* | 11/2021 | Kashi | G06Q 10/0836 |
| 2004/0252018 | A1* | 12/2004 | Shuster | G07F 17/13 |
| | | | | 340/5.73 |
| 2006/0046653 | A1* | 3/2006 | Kirbas | H04M 1/72412 |
| | | | | 455/41.2 |
| 2008/0246587 | A1 | 10/2008 | Fisher | |
| 2010/0099358 | A1* | 4/2010 | Kumar | H04W 52/0216 |
| | | | | 455/140 |
| 2010/0146151 | A1* | 6/2010 | Jeong | H04L 45/74 |
| | | | | 709/242 |
| 2011/0294582 | A1* | 12/2011 | Kawamoto | A63F 13/46 |
| | | | | 463/43 |
| 2014/0321321 | A1* | 10/2014 | Knaappila | H04W 8/005 |
| | | | | 370/254 |
| 2015/0026491 | A1* | 1/2015 | Park | G06F 1/3209 |
| | | | | 713/310 |
| 2015/0148093 | A1* | 5/2015 | Huang | H04M 1/72409 |
| | | | | 29/428 |
| 2015/0211258 | A1* | 7/2015 | Gokcebay | E05C 1/04 |
| | | | | 70/278.1 |
| 2015/0356801 | A1* | 12/2015 | Nitu | G07C 9/00912 |
| | | | | 340/5.61 |
| 2016/0325680 | A1* | 11/2016 | Curtis | H04N 5/265 |
| 2017/0124510 | A1* | 5/2017 | Caterino | G06K 7/1417 |
| 2018/0132183 | A1* | 5/2018 | Gattu | H04W 52/0203 |
| 2019/0020741 | A1* | 1/2019 | Knaappila | H04W 8/005 |
| 2019/0318557 | A1* | 10/2019 | Amuduri | G06Q 50/12 |

FOREIGN PATENT DOCUMENTS

| | | | | |
|---|---|---|---|---|
| WO | WO-2014032733 | A1* | 3/2014 | ........ H04W 52/0206 |
| WO | WO-2014168537 | A1* | 10/2014 | ........ H04W 52/0216 |
| WO | WO-2017035518 | A1* | 3/2017 | ......... B23Q 17/2409 |
| WO | 2017163018 | A2 | 9/2017 | |

OTHER PUBLICATIONS

Extended European search report for European Application No. 18306731.3 dated Jun. 11, 2019, 10 pages.

\* cited by examiner

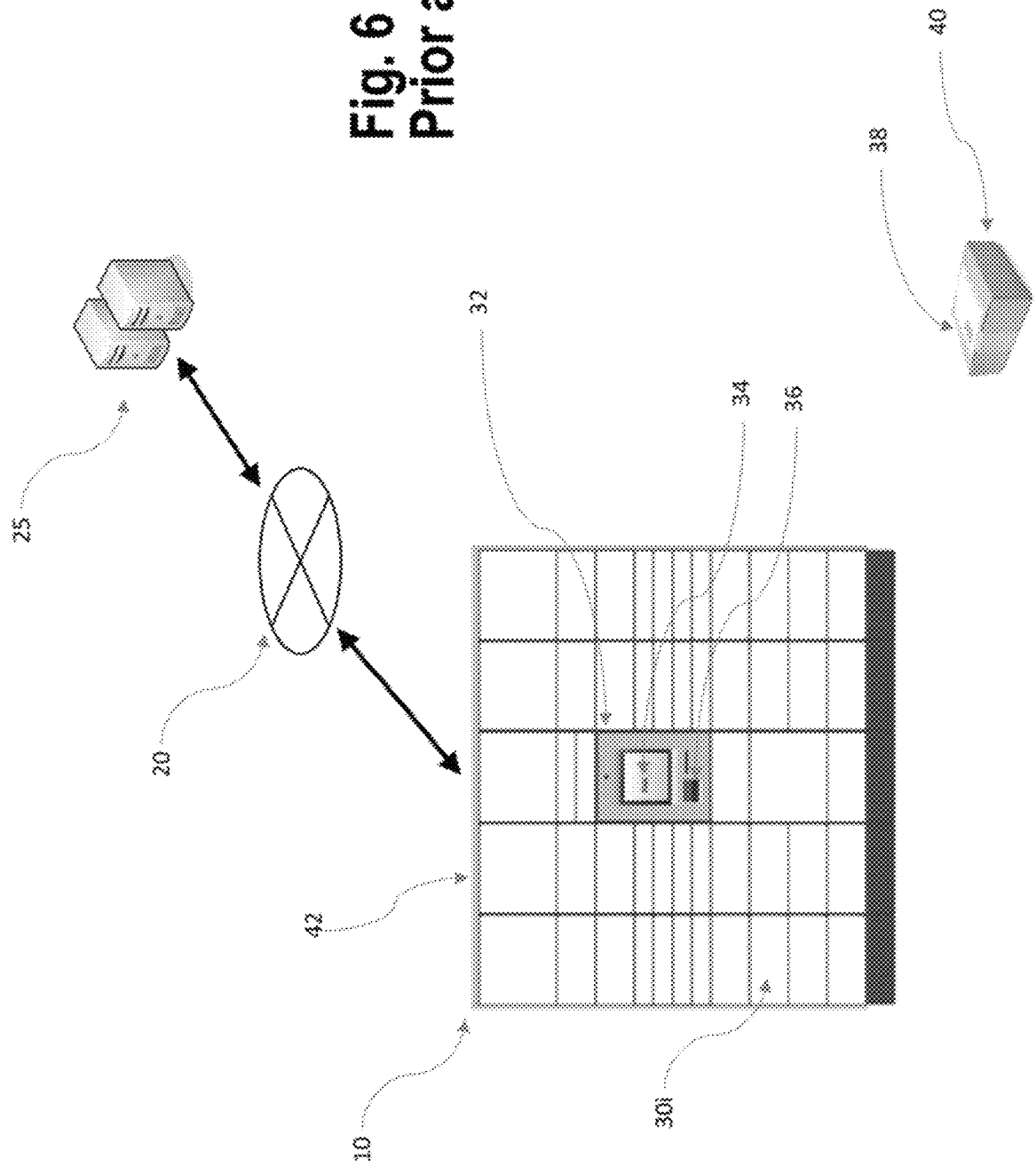

SECURED PARCEL LOCKER SYSTEM WITH IMPROVED SECURITY

FIELD OF THE INVENTION

The present invention relates to a system and methods for securely depositing shipments by a delivery agent, into electronic parcel lockers constituted of lockable compartments, and for securely picking-up these shipments thereafter.

PRIOR ART—BACKGROUND OF THE INVENTION

Electronic parcel locker systems are used for dropping-off, storing and picking up various kinds of shipments such as parcels or packages. These parcel locker systems typically are used by carrier agents for depositing shipments, which are then picked-up from the parcel locker by recipients. Electronic parcel lockers have a user interface for the carrier agent or the recipient to operate the parcel locker, which is used for depositing the shipment in the case of the carrier agent or for picking-up the shipment in the case of the recipient. This interface allows the user to enter information for operating the parcel locker and allows the parcel locker to provide information back to the user. For recent electronic parcel lockers, this functionality typically is fulfilled by a touchscreen. This user interface also is used to capture information attached to the shipment or to some user identification means. This functionality can be fulfilled by barcode readers reading printed barcodes or other technologies such as radio-frequency communication for reading RFID tags or near field communication. Electronic parcel locker systems generally comprise a network of parcel lockers, all communicating directly with a remote shipping system in charge of managing the network of parcel lockers, and eventually also managing data exchanges with the carrier information systems. The communication between each parcel locker and the remote shipping system is performed by long distance communication technologies such as GSM or 3G/4G.

FIG. 6 describes a prior art electronic parcel locker system, which comprises an electronic parcel locker 10 communicating via a long distance communication network 20 with a remote shipping system 25, which generates authorization codes for accessing the electronic parcel locker and communicates these codes directly to the electronic parcel locker and manages data regarding the shipments handled by the electronic parcel locker. The electronic parcel locker comprises a series of compartments 30i with different sizes and equipped with an electronically controlled door. The electronic parcel locker operation, and in particular the opening and closing of the compartment doors, is controlled by a central control unit 32. This central control unit 32 controls the communication with the remote shipping system 25 and the parcel locker user interface, which typically includes a touchscreen 34 and a barcode reader 36. When a carrier agent comes for depositing parcels into the electronic parcel locker 10, the identification 38 of each parcel 40 must be captured by the electronic parcel locker and is associated by the central control unit with the compartment where it is deposited. For tracking purposes, the identification 38 may be in the form of a barcode label affixed onto each parcel 40. Generally, compartments have a standard width and are assembled vertically into columns 42.

A first issue with such prior art electronic parcel locker systems is that the code authorizing the usage of the electronic parcel locker typically is entered manually by the parcel locker user. As the usage friendliness of the electronic parcel locker cannot be impacted by too complex codes, the complexity of the authorization codes is limited, therefore limiting the security of the parcel locker access.

More generally, prior art electronic parcel locker systems and their associated architecture have several issues. An electrical power connection is required, which can often be difficult to set up. The need for long distance communication between the electronic parcel locker and the server or servers of the remote shipping system imposes either the installation of a physical communication cable connecting the electronic parcel locker to the long distance communication network or imposes the usage of a wireless long distance communication system. Another issue is the complexity and cost involved with prior art electronic parcel lockers, which are assembled in a manufacturing plant and are shipped as a complete unit to the installation location. Vertical columns of compartments are typically pre-assembled and partially pre-wired in a manufacturing plant. Such architectures do not allow for easily swapping compartments or for easily upgrading or changing the parcel lockers configuration on site.

So there is a need for a new generation of parcel lockers allowing for cost reduction and more flexibility, including in particular compartment swaps and ensuring for an increased security.

OBJECT AND DEFINITION OF THE INVENTION

The object of the invention consists in providing a parcel locker system with some autonomous compartments clusters and therefore overcoming the above drawbacks.

This object is achieved by providing a method for operating at least one parcel locker constituted of at least one autonomous compartments cluster including at least one compartment and including a locking module, via at least one mobile device communicating via a long distance communication network with a remote shipping system; the method comprising: establishing a communication between the at least one mobile device and the remote shipping system, regularly emitting by the locking module, while in a sleep mode, a broadcasted short message addressed to the at least one mobile device for establishing a short distance communication session with the at least one mobile device, receiving by the at least one mobile device from the remote shipping system an authenticator generated by said remote shipping system and provided in a ciphered form to said at least one mobile device, this authenticator being used for sending by the at least one mobile device to the locking module a request including the authenticator, and deciphering with a secret key stored in the locking module the authenticator for an automatic validation of the request, wherein no authorization code is generated and provided to the locking module for the automatic validation of the request. Advantageously, the authenticator is unique or essentially unique. As a result of the short message broadcasting, any unauthorized mobile device proximate to the compartments cluster may receive a broadcasted short message, and may try to establish a communication and to access a compartment. The authorization method of the invention based on the insertion of an authenticator with each request secures the connection of authorized mobile devices with compartments clusters, and also prevents the locking module to have to store the authenticator as it is provided with each request addressed to the locking module.

In a preferred embodiment, authenticator is generated by the remote shipping system and is ciphered with a cluster secret key associated with the locking module and matching the secret key. Preferably, the cluster secret key is unique and uniquely associated with the locking module According to a feature of the invention, the automatic validation is performed by comparing a signature attached to the authenticator with a signature calculated by a cryptographic algorithm installed in the locking module based on the authenticator after deciphering. Advantageously, the signature is a hash. According to another feature of the invention, the automatic validation is performed by verifying a format and a content of the authenticator following on the deciphering or the automatic validation is performed by identifying a cryptographic salt included in the authenticator. Therefore, the security of the communication via the mobile devices as well as the access to the compartments is improved by the above validations.

In a particular embodiment, the request is further validated by checking whether an expiration time of the authenticator has been reached and in case the expiration time has been reached the request is not authorized resulting in a disconnection between the locking module and the mobile device. Advantageously, the expiration time is calculated based on a validity duration of the authenticator, which depends on a user category of the at least one parcel locker, and therefore the expiration time limits the validity duration of an authenticator for security reasons. Preferably, the validity duration is manually set or is defined by a program run on the remote shipping system, where the validity duration of an authenticator typically corresponds to a duration between the time when the authenticator is generated and the time when it may be used.

In another embodiment, the request is further validated by checking whether an authenticator identification included in the authenticator matches with an identification of another authenticator stored in a blacklist, and in case of match the request is not authorized resulting in a disconnection between the locking module and the mobile device. The blacklist allows authorizing the usage of an authenticator only once in order to prevent any unauthorized reuse of authenticators, and in particular preventing the risk that the authenticator is captured by an unauthorized person, who may then reuse the authenticator for establishing an unauthorized communication with the locking module.

According to a feature of the invention, when the request is authorized, the locking module stores and associates the authenticator identification and an expiration time of the authenticator in the blacklist. Advantageously, the locking module stores and associates the authenticator identification and the expiration time in the blacklist following on a disconnection request from the mobile device.

According to another feature of the invention, the locking module stores and associates the authenticator identification and an expiration time of the authenticator in the blacklist after a disconnection time-out has been reached following on an unintentional disconnection of the short distance wireless communication between the at least one mobile device and the locking module, therefore minimizing the number of generated authenticators.

In a particular embodiment, the expiration time is reached, the authenticator identification and the expiration time are deleted in the blacklist, therefore minimizing data storage in the locking module.

In a preferred embodiment, the authenticator is re-used for all requests within an established short distance communication session between the at least one mobile and the locking module, therefore minimizing the number of generated authenticators to be used for all the requests within a communication session to one.

In another embodiment, the authenticator identification and the expiration time are stored in the blacklist by the locking when the at least one mobile device requests a disconnection. Preferably, in case of unintentional disconnection and before the disconnection time-out is reached, the at least one mobile device re-uses the authenticator for re-establishing a connection with the locking module, therefore minimizing the number of generated authenticators.

According to a feature of the invention, the unique authenticator includes a privileges mask generated by the remote shipping system based on credentials of a user and wherein the at least one autonomous compartments cluster uses the privileges mask for validating access to functions, which are authorized for the user, and preferably, the at least one autonomous compartments cluster compares the locking module identifies a function targeted by the request within a functions table and checks whether the function is authorized by the privileges mask.

In a particular embodiment, the authenticator identification is unique and corresponds to a uniquely randomly generated string or to an incremental number or to a time for the generation of the authenticator by the remote shipping system.

According to another feature of the invention, the at least one mobile device is used as part of a network of mobile devices for establishing an asynchronous bidirectional multi-channel communication between the remote shipping system and the at least one autonomous compartments cluster of the at least one parcel locker, therefore requiring the solid security process of the invention via the use of authenticators.

In a preferred embodiment, once a communication session is authorized by a locking module with a mobile device, any request from any other mobile device is rejected.

Preferably, the at least one mobile device is used as a user interface for operating the at least one compartment of the at least one parcel locker, and advantageously, a program installed on the at least one mobile device for operating the at least one parcel locker is instantiated according to a user category established based on a login of a user of the at least one parcel locker.

In another embodiment, the method further comprises: requesting to the at least one mobile device by the remote shipping system the authenticator for establishing a communication with the at least one autonomous compartments cluster after capturing a first the broadcasted short message including a first unique cluster identification, and identifying by the remote shipping system the at least one parcel locker based on the first unique cluster identification received from the at least one mobile device.

According to a feature of the invention, the authenticator is generated by the remote shipping system and includes or is sent with a second unique cluster identification and comprises a compartment index wherein the firmware is configured for associating the compartment index with the at least one compartment.

In a particular embodiment, for establishing a communication or for authorizing an access, the at least one autonomous compartments cluster validates the authenticator received from the at least one mobile device and compares the second unique cluster identification with the first unique cluster identification stored in the locking module.

In a preferred embodiment, an initial set-up is performed via the at least one mobile device for generating the secret key by the locking module and storing the secret key in the locking module, preferably, the secret key is stored in a ciphered form. Therefore, the set-up could take place anywhere.

In another embodiment, the secret key is randomly generated and is replaced in case of similitude with other secret keys generated by other locking modules by an instruction from the remote shipping system.

According to another feature of the invention, the at least one mobile device requests for a public key from the remote shipping system for securing a transmission of the secret key from the locking module to the remote shipping system.

Preferably, the remote shipping system generates the public key and of a corresponding private key, and stores and associates the public key and the private key in a database, wherein the private and public keys ensure for a confidential and secure transfer of keys.

According to a feature of the invention, the public key is transmitted to the at least one mobile device by the remote shipping system and is stored temporarily in the mobile device.

According to another feature of the invention, the at least one mobile device receives a broadcasted short message from the locking module and a short distance wireless communication is established, and the at least one mobile device requests for a generation of the secret key and transfers the public key to the locking module.

In a preferred embodiment, the request for a generation of the secret key and the transfer of the public key are included within a same request in order to minimize the number of exchanges and so that no check may have to be performed on whether the public key has been transmitted. Preferably, the locking module ciphers the secret key with the public key and transmits the secret key in a ciphered form to the mobile device.

In a particular embodiment, the secret key is transmitted in a ciphered form by the at least one mobile device to the remote shipping system and is deciphered by the remote shipping system with the private key and stored in the remote shipping system as a cluster secret key and uniquely associated with the locking module in the database so that the secret key can later be used for ciphering data to be transmitted to the locking module, and in particular for ciphering authenticators, and for deciphering data received from the locking module. Advantageously, the cluster secret key is stored in the remote shipping system in a ciphered form.

In a particular embodiment, when a parcel is due for deposit in the at least one compartment, the at least one mobile device receives from the remote shipping system an authorization code, which is generated by the remote shipping system, and transfers the authorization code to the at least one autonomous compartments cluster so that a parcel recipient without a mobile device may pick-up the parcel by entering the authorization code via a lock interface, wherein preferably the authorization code is unique and uniquely associated with a unique parcel identification of the parcel, and advantageously the authorization code is a one-time code, which can be used only once by a parcel recipient.

According to a feature of the invention, the authorization code is requested by the at least one mobile device at the time of deposit of the parcel after the parcel for deposit has been identified.

According to another feature of the invention, the authorization code is generated and communicated by the remote shipping system to the at least one mobile device for temporary storage before or when a carrier agent plans for a daily delivery into the at least one parcel locker.

The invention also concerns an electronic locker system for parcel deposit and pick-up, comprising: a remote shipping system, at least one mobile device communicating via a long distance communication network with the remote shipping system, at least one parcel locker constituted of at least one autonomous compartments cluster including at least one compartment equipped with a door and including a locking module, which electronically controls locking and unlocking of the door and communicates locally with the at least one mobile device via a short distance communication, characterized in that the locking module comprises: an energy management module configured for managing transitions of energy modes and allowing the at least one compartment to be run in a sleep mode, a radio transceiver module equipped with an antenna, at least one processor configured for, while in the sleep mode, regularly emitting with the radio transceiver module a broadcasted short message towards the at least one mobile device, and a cryptographic module configured for deciphering with a secret key stored in a non-volatile memory an authenticator generated and encrypted by the remote shipping system and included in a request sent by the at least one mobile device.

According to another feature of the invention, the locking module is configured for generating the secret key with the cryptographic module and for storing the secret key in the non-volatile memory. Preferably, the cryptographic module is configured for generating a unique the secret key or an essentially unique key.

In a particular embodiment, the locking module is configured for an automatic validation of the request based on the deciphering the authenticator wherein no authorization code is generated and provided to the locking module for the automatic validation.

In another embodiment, the locking module includes a non-volatile memory storing a functions table comprising functions available for the at least one autonomous compartments cluster and which can be run by the at least one processor, and advantageously the unique authenticator includes a privileges mask identifying functions authorized for operating the at least one autonomous compartments cluster amongst functions within the functions table, where preferably the privileges mask consists in a series of bits wherein a bit of the series of bits corresponds to a function of the functions table and a value of the bit indicates whether the function is authorized or not authorized.

According to a feature of the invention, the remote shipping system is configured for receiving and storing credentials of a user of the at least one parcel locker and for generating the unique authenticator and for generating the privileges mask based on the credentials of the user.

In a preferred embodiment, the authenticator includes an expiration time limiting a validity duration of the authenticator. Advantageously, the authenticator includes an authenticator identification generated by the remote shipping system.

According to another feature of the invention, the locking module includes in the non-volatile memory a blacklist comprising an authenticator identification associated with an expiration time matching with the authenticator identification and the expiration time of the authenticator when the request is validated.

In preferred embodiment, the cryptographic module is configured for ciphering the secret key with a public key and for ciphering with the secret key data to transfer to the remote shipping system via the at least one mobile device.

In a particular embodiment, the cryptographic module is equipped with a symmetric Advanced Encryption Standard (AES) algorithm for generating and managing the secret key and is equipped with an RSA 2018 asymmetric encryption algorithm or an Elliptic Curve Digital Signature Algorithm (ECDSA) for deciphering messages with the public key.

In another embodiment, the remote shipping system includes in a database a cluster secret key associated with the locking module and matching the secret key. Preferably, the remote shipping system includes a remote cryptographic module and the public key and an associated private key are generated by the remote cryptographic module. The public and private keys are used for transferring the secret keys in a ciphered form between the locking modules and the remote shipping system According to a feature of the invention, the broadcasted short message comprises a first unique cluster identification relative to the at least one autonomous compartments cluster.

According to another feature of the invention, a request from the at least one mobile device for establishing a local communication with the locking module via the short distance communication includes the authenticator comprising or sent with a second unique cluster identification wherein the at least one processor is configured for checking for a match between the first unique cluster identification stored in the locking module and the second unique cluster identification.

In a particular embodiment, several of the at least one compartments cluster are mechanically fastened together to form a column, and preferably several of the columns of the at least one autonomous compartments clusters are mechanically fastened together to form the at least one parcel locker, therefore allowing for simple installation and configuration upgrade and servicing, including compartments cluster swaps.

In another embodiment, the authenticator comprises a compartment index wherein the processor is configured for associating the compartment index with the at least one compartment.

In a preferred embodiment, the locking module comprises a lock interface and an authorization code uniquely associated with a unique parcel identification corresponding to a parcel deposited in the at least one compartment so that a parcel recipient without a mobile device may pick-up a parcel by entering the authorization code via the lock interface wherein the remote shipping system is configured for generating and storing the authorization code and for transmitting the authorization code to the locking module via the mobile device.

Advantageously, the at least one mobile device is fixedly mounted next to the at least one parcel locker or directly onto the at least one parcel locker and connected to a local electrical network and said at least one processor can comprise a high energy processor module, a low energy processor module and a very low energy processor module.

BRIEF DESCRIPTION OF THE DRAWINGS

Other aspects, features and advantages of the teachings of the invention will become clearer to those ordinary skilled in the art upon review of the following description in conjunction with the accompanying drawings where:

FIG. 6 illustrates the prior art electronic parcel locker system.

DETAILED DESCRIPTION

Figure 1:
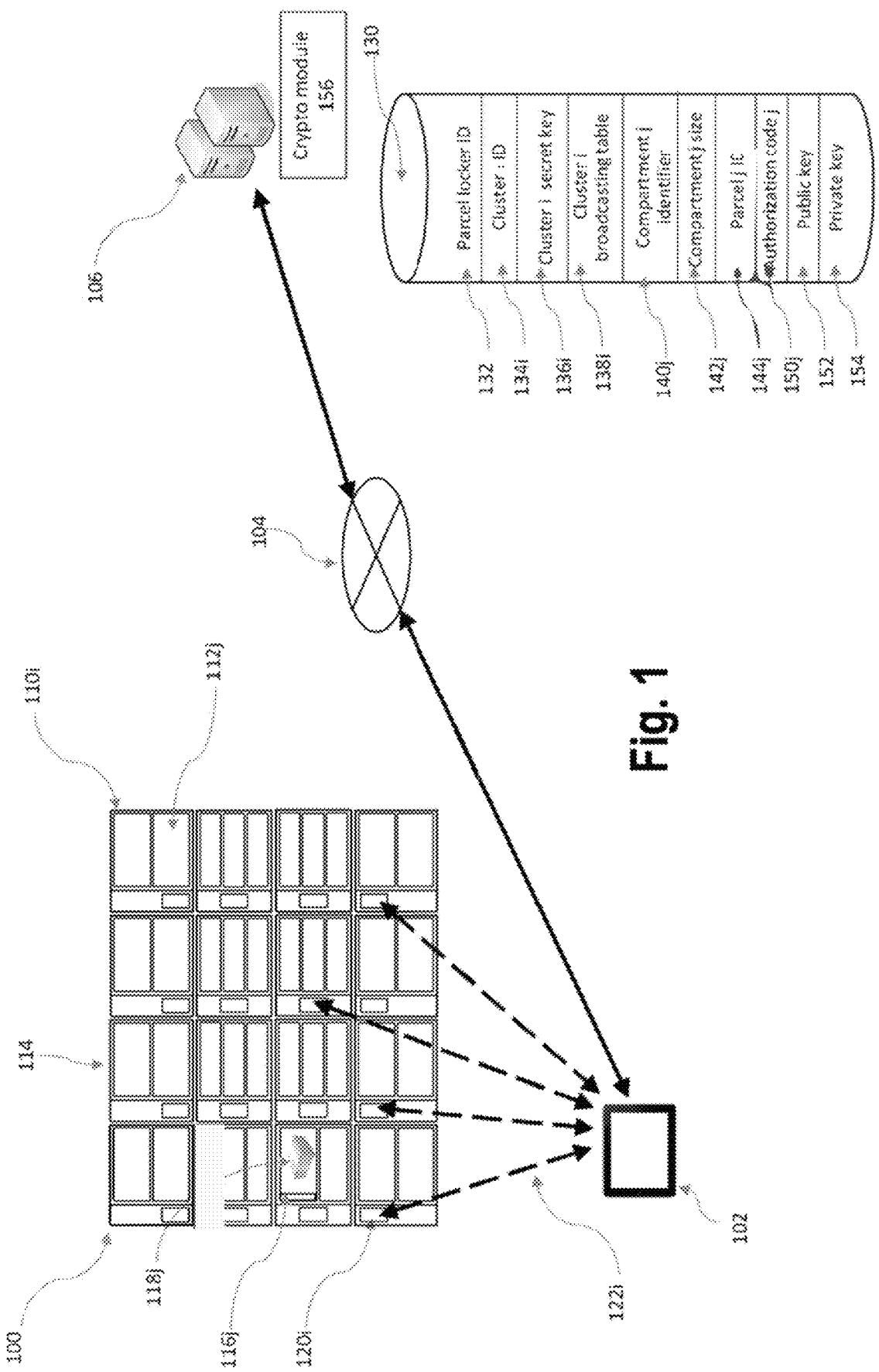
FIG. 1 represents an architecture of a parcel locker system according to an embodiment of the invention.

According to the invention, in order to avoid the necessity for power connection and for long distance communication and to allow for simple installation and configuration upgrade, autonomous clusters of compartments interacting locally with mobile devices via short distance wireless communication are disclosed. FIG. 1 illustrates an embodiment of a parcel locker system of the invention comprising a parcel locker 100, a mobile device 102 communicating via a long distance communication network 104 based on a technologies such as 3G-4G or GSM with a remote shipping system 106, which manages authorization access to the parcel locker 100 and manages data regarding the shipments handled by the parcel locker 100. The parcel locker 100 is constituted of autonomous compartments clusters 110$i$, which may comprise several compartments 112$j$. The compartments 112$j$ and the autonomous compartments clusters 110$i$, having a same width, may have different heights to cope for best matching with different parcel sizes. Such compartment clusters typically comprise two or three compartments, or eventually only one large compartment. The compartment clusters can be piled up and mechanically fastened together to form a column 114. The columns 114 can then be mechanically fastened together to form a larger parcel locker unit. An autonomous compartments cluster is characterized by a design without any power connection or long distance communication, allowing for simple installation and configuration upgrade. Each compartment 112$j$ is equipped on the front with a hinged door 116$j$, which when opened allows for depositing in the compartment or retrieving from the compartment a parcel 118$j$. Each autonomous compartments cluster 110$i$ comprises a communicating locking module 120$i$, which electronically controls the locking and unlocking of each door of the compartments of the cluster. Each locking module 120$i$ can establish a local communication with a nearby mobile device 102 via a short distance wireless communication 122$i$, such as WIFI, IR or Bluetooth. Although preferably a mobile device such as a smartphone or a PDA, the device 102 may also be a stationary computerized device, such as a PC or a laptop, having some short distance wireless communication capabilities compatible with the short distance communication capabilities of the locking modules.

The mobile device 102 can be a smartphone or personal digital assistant (PDA) or any computerized mobile device having some short distance wireless communication capabilities compatible with the short distance communication capabilities of the locking modules and having some long distance communication capabilities compatible with the long distance communication capabilities of the remote shipping system 106. According to the invention, the mobile devices are used as user interfaces for operating the compartments of the parcel locker, replacing the central user interfaces of prior art parcels lockers, which therefore are not required on the parcel locker of the invention. More generally, the mobile devices are used as a channel for communication between the remote shipping system and the locking modules of the parcel lockers allowing the establishment of an asynchronous bidirectional multi-channel communication. As a result, the remote shipping system may for example transfer via any mobile device an instruction for blocking the operation of a compartment or a locking module of a compartments cluster may transfer via any mobile device information such as events regarding operations within compartments of the compartments cluster to the remote shipping system. It is therefore essential that the communication via the mobile devices be secured as well as the access to the compartments via the mobile devices.

Different categories of users can interact with the compartments of the parcel locker via their mobile device including parcel recipients or site owners or carrier agents, who typically may use a PDA. Preferably, the mobile devices shall be smartphones, in particular in the case of the parcel recipients, so that they can use their personal smartphones. A mobile parcel locker application (MPL application) for operating locally the parcel locker compartments may be installed on the mobile devices and preferably may be downloaded from a remote server, for example via an application store. In order to provide the easiest and broadest access to the parcel locker service, the MPL application may be downloaded from a standard application store such as Google Play or App Store. The MPL application includes sub-programs for installing or servicing the parcel locker, typically for site owners, or for delivering parcels, typically for carrier agents, or for picking-up parcels or for receiving notifications, typically for the parcel recipients. Preferably, the MPL application is instantiated according to the user category. In the case of a carrier agent PDA, the MPL application may be integrated in the carrier agent software module installed on his PDA for delivering parcels. Such an easy and open access to the MPL application also requires that the communication via the mobile devices be secured as well as the access to the compartments via the mobile devices, and the system security is addressed by the authorization features and process of the invention as described below.

To prevent any communication and eventually any access to a compartment from an unauthorized device, an authenticator, preferably unique, must be provided as part of a request from a mobile device for establishing a communication session, and this authenticator is checked by the locking module of the compartments cluster for authorizing the establishment of a communication session, and eventually for authorizing any request from a mobile device. The authenticator is provided by the remote shipping system to the authorized mobile device in a ciphered form. Then, the authenticator is provided to the locking module by the mobile device for establishing a communication session, and the authenticator is deciphered by the locking module for validating the request. As a result, an authenticator can be automatically transmitted by a mobile device of a parcel recipient for accessing a compartment of a parcel locker when the recipient is in the proximity of the parcel locker. No authorization code is required to be entered via a user interface of the parcel locker like in the prior art, therefore improving the access security and the user experience.

The remote shipping system comprises a database system 130, which may include several databases eventually installed on several server systems operated by shipping carriers or by a service company owning or managing a parcel locker park. The database system 130 stores configurations of all the parcel lockers 100 to be controlled by the remote shipping system. Each parcel locker configuration (PL configuration) includes a unique parcel locker identification 132, and for each compartments cluster 110$i$ of the parcel locker, a unique cluster identification 134$i$ and a preferably unique cluster secret key 136$i$. The PL configuration also includes for each compartments cluster a cluster broadcasting table 138$i$ comprising a repetition time period parameter, a listening time window parameter and a power emission parameter, which correspond to optimized parameters for the locking module to broadcast short messages towards mobile devices. Each compartment of the compartments cluster may be identified by a compartment index also stored in the database 130 and indexing the compartment amongst the compartments of the compartments cluster. The association of a unique cluster identification and of a compartment index allows for a unique identification of the compartment (unique compartment identification). In addition, the PL configuration includes for each compartment 112$j$: a compartment identifier 140$j$ that is replicated on the compartments cluster as a visual identifier for the user, a compartment size 142$j$, and a unique parcel identification 144$j$, if a parcel is deposited in the compartment 112$j$. The database system 130 also stores credentials of the parcel lockers users and information for communicating with them such as phone numbers and email addresses. In particular, the database system 130 stores for each parcel recipient a unique authorization code 150$j$, which may be required for the parcel recipient to pick-up his parcel and which is generated by the remote shipping system for each parcel deposited in a compartment. The unique authorization code 150$j$ is associated with the recipient credentials and uniquely associated with the parcel identification 144$j$ of the corresponding parcel.

A public key 152 is stored in the database 130 and is used for transferring secret keys between the locking modules and the remote shipping system. A private key 154 associated with the public key 152 is also stored in the database and used for deciphering data ciphered with the private key. The remote shipping system comprises a remote cryptographic module 156 configured for generating the associated private key and public key, for deciphering data with the private key, in particular for the transmission of the secret keys, for ciphering data with the secret keys for example to transfer data to a locking module via a mobile device, and for deciphering data with the secret keys for example received data from a locking module via a mobile device. The remote cryptographic module is equipped with an asymmetric encryption algorithm, preferably a RSA 2018 algorithm or an Elliptic-Curve Cryptography (ECC) type algorithm such as an Elliptic Curve Digital Signature Algorithm (ECDSA) for generating and managing the public and private keys, and is equipped with a symmetric encryption algorithm, preferably a Advanced Encryption Standard (AES) algorithm, for ciphering and deciphering messages with the secret keys.

The usage of autonomous compartments clusters provides easiness and flexibility, in particular as it avoids the need for any electrical wiring around the compartments clusters or for any electrical power connection. However, there is a major requirement for minimizing the power consumption of each compartments cluster, and therefore there is the need for the locking modules for minimizing communication and data exchanges, which are significant source of energy consumption, as well as data storage in the locking modules.

One way for minimizing the power consumption is to implement low energy modes or sleep modes for the operation of the locking modules. In parallel, there is a need for optimizing usability of the parcel locker including in particular ensuring the user does not have to wait for too long a time in front of the parcel locker for example due to long data exchanges. These aspects are addressed by the invention as detailed below.

Figure 2:
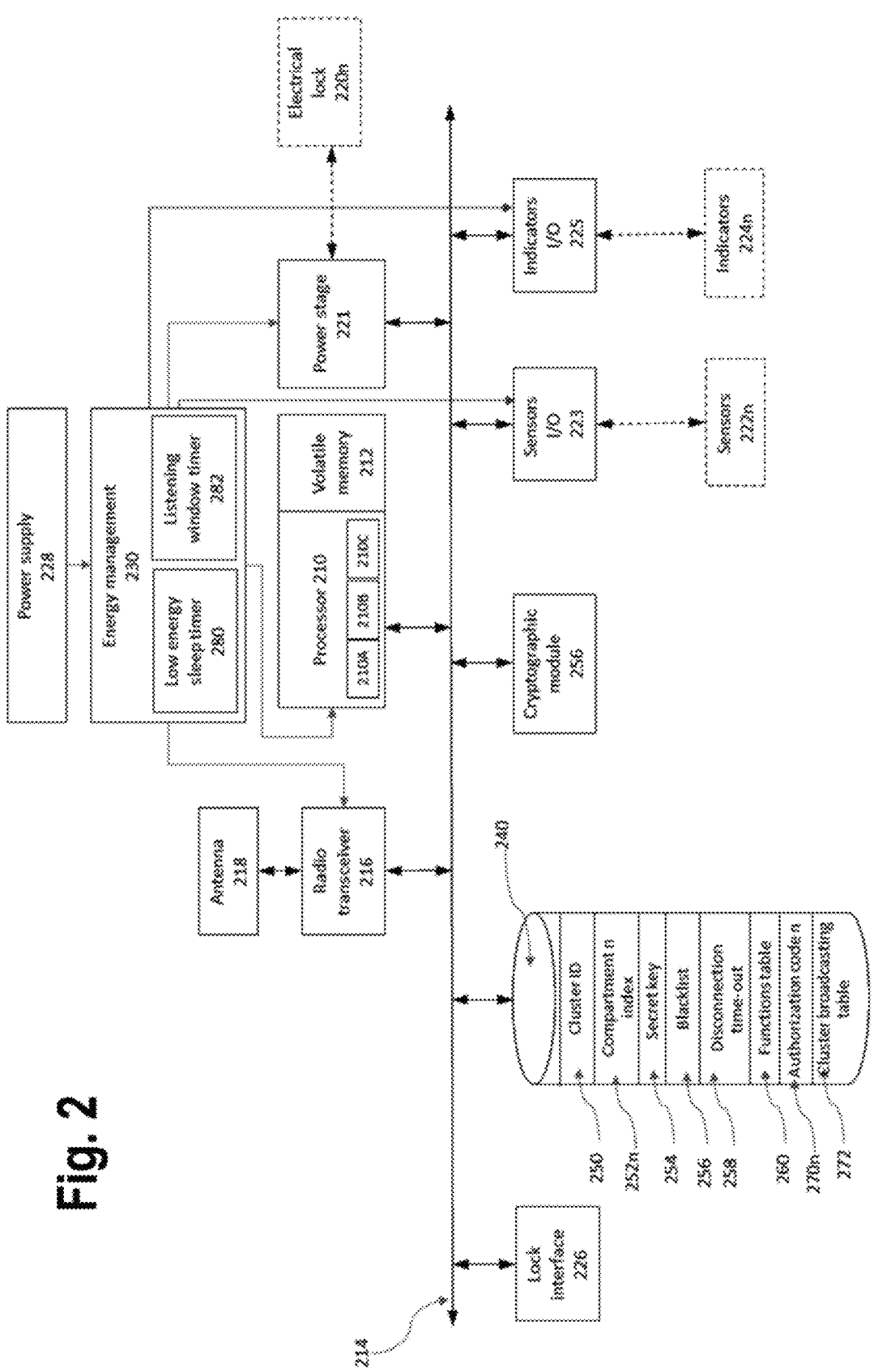
FIG. 2 illustrates an architecture of a locking module according to an embodiment of the invention.

FIG. 2 illustrates a locking module 120*i* of a compartments cluster 110*i*, which comprises a processor or a group of processors 210 and associated volatile memory 212 controlling the major components of the locking module via a bus 214 or via direct control lines. The short distance wireless communication is carried out by a radio transceiver module 216 equipped with an antenna 218. The radio transceiver module may include some registers or may have access to dedicated registers within the locking module memories. These registers dedicated to the radio transceiver module include setting data for the operation of the radio transceiver module and the antenna and data relative to initial messages or broadcasting short messages sent by the locking module for initiating communication with a mobile device or several mobile devices. The door of each compartment of the compartments cluster is equipped with an electrical lock 220*n*. The door fastening of the electrical locks is performed via a power stage 221, which in particular provides the power for the electrical locks under the control of the processor 210, and is directly controlled by the processor 210. Sensors 222*n* may be provided for each compartment for establishing the status of the electrical lock (locked/unlocked) or the status of the door (opened/closed) or whether the compartment is empty or full. The powering of the sensors as well as the measurements performed by the sensors are provided via the sensors input/output ports (I/O) 223 of the locking module. A visual indicator 224*n*, such as light emitting diode (LED), may be attached onto each compartment and controlled by the processor, for example for indicating which compartment should be used for depositing or for picking-up a parcel. Powering of the indicators is provided via the indicators input/output ports (I/O) 225 of the locking module. Preferably, when a door is unlocked, the door automatically opens, thanks for example to a spring mechanism, and therefore indicates which compartment should be used without any need for a visual indicator. Although the system is designed to be operated with a mobile device such as a smartphone by a parcel recipient, a lock interface 226, such as a pin-pad or another interface known in the art, is also provided for a parcel recipient who does not possess a mobile device, so that he can access a compartment by entering his authorization code with the lock interface. A compartment identifier such as a number may be attached on a visible part of each compartment, for example on the door, so that a user may identify a particular compartment. Thus, a recipient who does not possess a mobile device, may identify the compartment from which he needs to pick-up a parcel and the associated lock interface located near the compartment. Alternatively, a cluster identifier such as a number may be attached on a visible part of each compartments cluster so that a user may identify the particular compartments cluster and the associated lock interface. Thus, a recipient who does not possess a mobile device, may identify a compartments cluster from which he needs to pick-up a parcel, and use the corresponding lock interface for opening the compartment.

The locking module is powered by a power supply 228, which may be replaceable batteries or rechargeable batteries via solar panels or energy harvesting equipment or any other electrical energy supplies. In order to minimize the power consumption, an energy management module 230 manages transitions of energy modes and allows the compartments cluster 110*i* to be run in different low energy modes or different sleep modes. Each energy mode defines which peripheral or component is available and limits the amount of current consumed by the peripherals or components. For example, the energy management module may turn off or on the power of unused blocks of the volatile memory 212 or may turn off or on the radio transceiver module. The energy management module may comprise voltage regulators and timers for switching between energy modes.

A non-volatile memory 240 controlled and directly accessible by the processor stores the firmware run by the processor 210 and data received from the remote shipping system via mobile devices or generated within the compartments cluster 110*i* such as operation events. The data stored in the non-volatile memory 240 comprise a cluster identification 250, which uniquely identifies the compartments cluster, a compartment index 252*n* used for indexing each compartment amongst the compartments of the compartments cluster, a secret key 254, a blacklist 256 for managing communication establishment with mobile devices, and a disconnection time-out 258 for managing unintentional disconnection of the short distance wireless communication between the mobile device and the locking module. The non-volatile memory 240 also stores a functions table 260 corresponding to all the functions, which are available for the compartments cluster operation and which can be run by the processor 210 on request by an authorized mobile device, and may store for each compartment of the compartments cluster a unique authorization code 270*n*, which may be requested from a recipient for his picking up of a parcel in the compartment, and may store a cluster broadcasting table 272.

The locking module also comprises a cryptographic module 256 configured for generating the secret key 254, for ciphering data with the secret key for example to transfer them to the remote shipping system via a mobile device, for deciphering data with the secret key for example for received data from the remote shipping system via a mobile device, and for ciphering data with the public key 152 in particular for ciphering the generated secret key to transfer it to the remote shipping system via a mobile device. During a set-up phase of a parcel locker, each locking module generates and stores a preferably unique secret key, which is then transmitted to the remote shipping system and stored in the remote shipping system as a cluster secret key 136*i* uniquely associated with each particular locking module and cluster. The ciphering of data with a specific secret key either by the locking module or by the remote shipping system allows for secured and confidential exchanges via mobile devices. The cryptographic module 256 is equipped with a symmetric encryption algorithm, preferably a Advanced Encryption Standard (AES) algorithm for generating and managing the secret keys, and is equipped with an asymmetric encryption algorithm, preferably a RSA 2018 algorithm or an Elliptic-Curve Cryptography (ECC) type algorithm such as an Elliptic Curve Digital Signature Algorithm (ECDSA) for deciphering messages with the public key.

The secret key 254 may be randomly generated by the cryptographic module 256 with a very low probability of similitude with keys randomly generated by other locking modules, and is therefore essentially unique. For example, for an AES 256 cryptographic module generating randomly a key, the probability of similitude is lower than one chance in ten to the power of seventy-seven. In such a case, the remote shipping system may check on similitudes and instruct a change of some secret keys to ensure for the unicity of the secret keys.

In order to communicate with a locking module 120$i$ via short distance wireless communication, a mobile device 102 also comprises a radio transceiver module equipped with an antenna controlled by a processor running an associated short distance wireless communication software. In particular, it comprises a scanning function for discovering the different compartments clusters that it may have to communicate with. Such hardware and software components are commonly available for smartphones or PDAs.

When a compartments cluster is not in use, the locking module is in a deep sleep mode, i.e. a very low energy mode so as to minimize the power consumption of the compartments cluster. In such deep sleep mode, the energy level of the compartments cluster is below 10% of the average energy consumption when the compartments cluster is awake and fully operational. Only very limited functions are available, and in particular the radio transceiver module is asleep and the locking module cannot communicate with and cannot be wakened up by a mobile device proximate to the compartments cluster. In order to allow for initiating a communication session with a mobile device, when in deep sleep mode, the locking module temporarily partially wakes-up for broadcasting short messages. This partial wake-up, corresponding to a low energy sleep mode, activates the radio transceiver module and can be controlled by the energy management module, which can comprise a low energy sleep timer 280 for triggering transitions to the sleep mode. In sleep mode, additional functionalities, compared to the deep sleep mode, is limited to sending broadcasted short messages and waiting for a response. The operation of the locking module can be controlled by a processor constituted of several processor modules comprising a high energy processor module 210A controlling high level functionalities including the communication management and the access authorization management, which is de-activated in sleep mode, and a low energy processor module 210B controlling the radio transceiver module for sending broadcasted short messages and waiting for a response, which is de-activated in deep sleep mode, and a very low energy processor module 210C for minimal control. The energy management module manages the switches between these modes and the associated energy consumption. The operation of the locking module also can be controlled by separate processors cooperating together and whose activity and energy consumption are managed by the energy management module. For example, a particular processor may control the radio transceiver module and may be specifically awakened during the sleep mode.

To minimize the power consumption, the locking module is generally maintained in a deep sleep mode. In order to allow communication with a mobile device, the low energy sleep timer 280 regularly triggers a transition from deep sleep mode to sleep mode according to a repetition time period. Once in sleep mode, the locking module sends a broadcasted short message and actively listens to a response from a mobile device during a limited listening time window. The end of the listening time window is triggered by a listening time window timer 282, which can be comprised in the the energy management module. A mobile device proximate to the compartments cluster and whose short distance wireless communication is activated, has a scanning function listening to broadcasted short messages from locking modules. When the mobile device captures a broadcasted short message from a locking module, and if the mobile device needs to establish a communication with the locking module, the mobile device immediately sends a response message to the locking module for establishing the communication so that the response message can be captured within the limited listening time window of the locking module.

The reception by the radio transceiver module of a response message from the mobile device triggers a full wake-up of the locking module. The energy management 230 activates the processor high level functionalities by activating the high energy processor module 210A controlling high level functionalities or by activating the corresponding processor in case of an architecture with separate processors cooperating together. For establishing a communication with the mobile device, a full wake-up of the locking module is required as in sleep mode the locking module cannot perform an authorization for a communication session with the mobile device and cannot complete the establishment of a communication. Once the communication is established, the mobile device then behaves as a client initiating requests and commands, and accepting responses from the locking modules. The locking module behaves as a server receiving requests and commands, and performing requested actions and returning responses. As a result, any unauthorized mobile device proximate to the compartments cluster may receive a broadcasted short message from the compartments cluster, and may try to establish a communication and to access a compartment. The authorization method of the invention based on the usage of an authenticator secures the connection of authorized mobile devices with compartments clusters.

If no response from a mobile device to the broadcasted short message is captured by the radio transceiver module within the limited listening time window, the listening time window timer 282 triggers the end of the sleep mode and the energy management 230 manages a return to the deep sleep mode and de-activates the radio transceiver module and the low energy processor module 210B.

When a mobile device receives a broadcasted short message from a particular compartments cluster, the mobile device may need to establish a communication session with that particular compartments cluster for example to transfer to the remote shipping system events stored in the compartments cluster or to deposit a parcel into a compartment of the compartments cluster or to pick-up a parcel from a compartment of the compartments cluster. To prevent any communication and eventually any access to the compartments cluster from an unauthorized device, a preferably unique authenticator, generated by the remote shipping system, has to be provided as part of a request from the mobile device for establishing a communication session.

The authenticator includes or is sent with the unique cluster identification, which is checked by the locking module for ensuring that the request is addressed to an appropriate compartments cluster, and includes a compartment index identifying a compartment associated with the communication session being established (for example for a deposit in that particular compartment or a pick-up from that particular compartment). The request from the mobile device for establishing a communication session may be received by other compartments clusters, but will be rejected as there is no match on the cluster identification. Once a communication session is authorized by the compartments cluster with the mobile device, any request from any other mobile device is rejected. During the communication session, any request from the mobile device to the compartments cluster may need to include the authenticator. The authenticator is generated by the remote shipping system and is provided to the mobile device by the remote shipping system.

Figure 3:
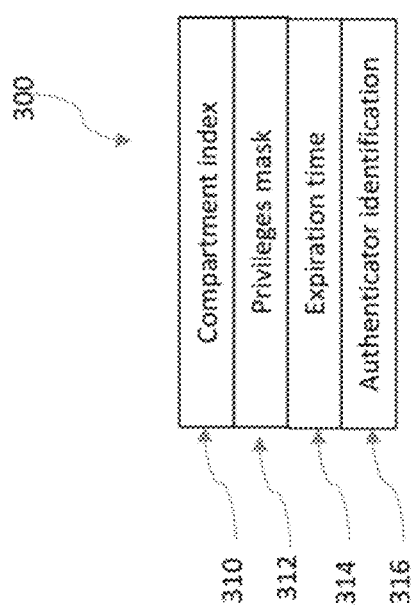
FIG. 3 illustrates an embodiment of an authenticator of the invention.

FIG. 3 illustrates an embodiment of an authenticator 300 of the invention. In order to minimize the number of exchanges between a locking module 120i and a mobile device 102, the authenticator comprises some critical data so that the locking module does not need to request them later on from the mobile device. The authenticator includes a compartment index 310 identifying a compartment associated with the communication session being established (for example for a deposit in that particular compartment or a pick-up from that particular compartment), and a privileges mask 312, which identifies, amongst all available functions within the functions table 260, the functions that are authorized. The generation of a privileges mask by the remote shipping system depends on the user and in particular on the user category. The remote shipping system then provides the privileges mask to the mobile device within the authenticator. The privileges mask, as well as the authenticator, is generated by the remote shipping system following on a login of the user into the MPL application, which is installed on his mobile device for interacting with the parcel locker compartments, and which automatically requests an authenticator from the remote shipping system. Following on the establishment of a communication session, the privileges mask received by the compartments cluster is used for the compartments cluster to provide access to the functions, which are authorized for the particular user. The privileges mask may be stored in volatile memory and addressed by the firmware run by the locking module for checking on the functions authorized for the particular user. In order to minimize the size of the privileges mask and therefore participate in minimizing the data volume exchanged with the locking module, the privileges mask consists in a series of bits, preferably a 32 or 64 bit series, where each bit corresponds to a particular function of the functions table 260. The bit value indicates whether the function is authorized or not authorized. For example, a bit set at 1 may indicate that the function is authorized and a bit set at 0 may indicate that the function is not authorized. Such a format for the privileges mask allows for a compression of information and for a convenient inclusion of the privileges mask into the authenticator, which prevents the need for additional communication between the compartments cluster and the mobile device to define the authorized functions. The authenticator also includes an expiration time 314 after which the authenticator is not valid anymore. The expiration time limits the validity duration of an authenticator for security reasons. The validity duration of an authenticator typically corresponds to a duration between the time when the authenticator is generated and the time when it may be used for example for a pick-up by a parcel recipient or for a parcel deposit by a delivery agent, and may be up to several days. The expiration time is calculated by the remote shipping system based on the validity duration, which may depend on the user category or other usage conditions and may be configured in the remote shipping system. For a parcel recipient, the validity duration corresponds to the time granted to recipient for picking up his parcel before a carrier agent removes it for freeing up some compartment space and may be between two and five days. For a carrier agent, the validity duration corresponds to the maximum time planned for the carrier agent to deliver a parcel in a parcel locker and may vary depending on the carrier organization. The validity duration may be either manually set by a server administrator or may be adjusted or defined by a program run on the remote shipping system. Each authenticator also comprises an authenticator identification 316, which is generated by the remote shipping system at the time of generation of the authenticator. The authenticator identification is randomly generated by the remote cryptographic module 156 with a very low probability of similitude with other authenticator identifications generated for other authenticators, and is therefore essentially unique. For example, for an AES cryptographic module generating random integers of 32 bits, the probability of similitude is lower than one chance in four billions. In such a case, the remote shipping system may check on similitudes and exclude any authenticator identification, which has already been generated. Preferably, the authenticator identification is unique and the remote shipping system may comprise a remote cryptographic module generating random and unique authenticator identifications.

In order to minimize resources, and in particular energy consumption, for the locking module to handle authenticators, either during communication with mobile devices or during internal processing, authenticators' size is minimal. In particular, no authorization code is included in an authenticator. Authorization codes are exchanged as part of messages within a communication session following on requests, typically from a locking module.

In order to minimize data exchanges between a mobile device and a locking module, an authenticator generated for a mobile device to be able to establish a communication session with a particular locking module is ciphered with the cluster secret key corresponding to that particular locking module. For authorizing communication session with the mobile device, the locking module uses its secret key for checking the authenticator. Therefore, no specific validation code is required to be provided by the mobile device, as the authorization is based on the ciphering performed with the cluster secret key corresponding to the particular locking module.

When a mobile device transmits an authenticator for establishing a communication with a locking module, there is a risk that the authenticator is captured by an unauthorized person, who may then reuse the authenticator for establishing an unauthorized communication with the locking module. In order to prevent any unauthorized reuse of authenticators, a locking module authorizes the usage of an authenticator only once for establishing a communication. When a locking module authorizes the establishment of a communication with a mobile device based on the authenticator provided by the mobile device, the locking module stores and associates the authenticator identification and the expiration time of the authenticator in the blacklist 256. Thereafter, when the authenticator identification of the authenticator provided by a mobile device is already stored in the blacklist 256, the locking module shall refuse to establish a connection resulting in a disconnection between the locking module and the mobile device. In order to minimize data storage in the locking module, when the expiration time is reached, the authenticator identification associated with the expiration time is deleted from the blacklist as well as the corresponding expiration time.

The invention provides multiple checks for securing access to a compartment and securing the communication with the corresponding locking module. First, the establishment of a communication with the locking module is authorized based on the deciphering of an authenticator with a preferably unique secret key generated by and associated with the locking module. Then, the validity of the authenticator is checked regarding its expiration time and whether it has already been used via the blacklist. Then, the action request is checked based on the privileges granted to the user. Additionally, once a communication session is authorized by a locking module with a mobile device, any request from any other mobile device is rejected. During the communication session, any request from the mobile device to the locking module must include an authenticator, and each of the above checks are performed. A new authenticator may be required for each request. However, in order to minimize the number of generated authenticators, the same authenticator may be used for all the requests within a communication session. In this case, the storage in the blacklist of the authenticator identification and the associated expiration time is performed by the locking at the time of a de-connection by the mobile device.

The system security also is improved by the unicity or quasi-unicity of the authenticator. Each authenticator generated by the remote shipping system combines a privileges mask specific to the user category, an expiration time specific to the time of creation of the authenticator and an authenticator identification essentially unique as it is randomly generated by the remote cryptographic module. In addition, each authenticator is ciphered with a secret key essentially unique for a particular locking module. Therefore, each authenticator is essentially unique. To ensure the unicity of an authenticator, the remote shipping system may generate unique authenticator identifications, for example by excluding any similar authenticator identifications or by generating random and unique authenticator identifications.

As opposed to prior art parcel lockers, which include a central control unit monitoring and storing the status of the different compartments of the parcel locker and which controls the different compartments, a parcel locker of the invention constituted of autonomous compartments does not include any central control unit. In the parcel locker system of the invention, the monitoring and the storing of the status of the compartments is performed by the remote shipping system, which delegates the local control of the compartments to the MPL application. All necessary data is transmitted by the remote shipping system to mobile for operating parcel locker. In particular, when a parcel deposit into a parcel locker of the invention is initiated by a carrier agent, the PL configuration is provided by the shipping remote server to the carrier agent MPL application. The PL configuration includes all cluster identifications and parcel identifications of parcels deposited in compartments of the parcel locker. The PL configuration is essential for a user to be able to operate the parcel locker via his mobile device, for example, for a carrier agent to be able to select in which compartment a parcel can be deposited. Preferably, the PL configuration is requested by the MPL application to the remote shipping system following on the reception by the mobile device of a first broadcasted short message from a compartments cluster.

Based on the unique cluster identification 250 comprised in the broadcasted short message and transferred to the remote shipping system within the PL configuration request, the remote shipping system identifies within its database system 130 the corresponding parcel locker and provides the PL configuration to the mobile device. Once the PL configuration is received by the mobile device, a compartment available for deposit can be identified by the MPL application and a communication session can be established by the mobile device with a compartments cluster comprising that compartment for the deposit of a parcel. The compartment availability is established based on the cluster status table 136i included in the PL configuration provided by the remote shipping system as whether a parcel identification is associated with a compartment of the compartments cluster—i.e. associated with a compartment identification. Based on the events limit 252 received from a compartments cluster with a broadcasted short message, the MPL application establishes that a PL configuration update may be required. In an alternative embodiment, the PL configuration is received from the remote shipping system before the carrier agent arrives near the parcel locker and the parcel deposit can start before broadcasted short messages are received by the mobile device from all the compartments clusters of the parcel locker, therefore minimizing delays for the carrier agent.

Based on the PL configuration, the MPL application also can establish the number of compartments clusters, which constitute the parcel locker, and can check that a broadcasted short message is received from all the compartments clusters of the parcel locker. The efficiency of parcels deposit by a carrier agent depends on the accuracy of the PL configuration provided by the remote shipping system. It is therefore important that events relative to the compartments of a parcel locker be transferred as soon as possible to the remote shipping system. Preferably, events are transferred as part of any user operation on the parcel locker via the mobile device of the user. However, some parcel recipients may pick-up their parcel without using a mobile device or some operations may not allow for the transfer of events to a mobile device. So, any event relative to a compartments cluster, either during a user operation such as a deposit or during a compartments cluster internal operation such as a low power status, is stored in the events table 255 so that it may be transferred to the remote shipping system via any mobile device performing an events upload towards the remote shipping system.

An aspect of the invention is that the parcel locker system of the invention allows for the establishment of an asynchronous bidirectional multi-channel communication between the remote shipping system and the compartments clusters of the park of parcel lockers, where the multiple mobile devices constitute a multi-channel network. An asynchronous communication is established in the direction of the remote shipping system from a compartments cluster via a mobile device following on the establishment of a communication session between the mobile device and the compartments cluster, for example to transfer data such as events from the compartments cluster to the remote shipping system. The mobile device temporarily stores the data until their transfer to the remote shipping system can be completed. This transfer can be performed via any mobile device with an installed and activated MPL application for operating parcel lockers so that the data may be uploaded via the first mobile device, which establishes a communication with the compartments cluster. In the other direction, the remote shipping system communicates to a compartments cluster via a mobile device either data such as authenticators or instructions for example for blocking the operation of a compartment. The data or requests are temporarily stored in the mobile device until their transfer to the compartments cluster can be completed. This asynchronous communication can be carried out via any mobile device with an installed and activated MPL application.

Preferably, the remote shipping system selects some preferred mobile devices for communicating with a compartments cluster according to preset rules. A preset rule may be that a communication from the remote shipping system to a particular compartments cluster is addressed only to mobile devices, which are making requests to the remote shipping system regarding the particular compartments cluster such as for a coming up deposit of parcels. Such a rule ensures that communications from the remote shipping system are channeled only through mobile devices, which are most likely to establish a communication with the particular compartments cluster. The bidirectional communication may be established based on web socket technology. According to the invention, the mobile devices with an installed MPL application for operating the parcel lockers constitute a multichannel asynchronous network for communicating between the remote shipping system and a compartments cluster, therefore optimizing the efficiency of the communication while the invention also allows for parcel lockers to be operated in areas not covered by long distance wireless communication. Data or requests from the remote shipping system may be communicated to and temporarily stored in a mobile device before entering the area not covered by long distance wireless communication, and data from compartments clusters may be temporarily stored in a mobile device until the mobile device exits the area not covered by long distance wireless communication to complete the transfer to the remote shipping system.

The establishment of an asynchronous bidirectional multi-channel communication via untrusted mobile devices, i.e. any mobile device having downloaded the MPL application, requires a solid security process, which is provided by the invention via the use of authenticators and the checks described above.

The system is designed to be operated by a parcel recipient either with a mobile device such as a smartphone or without a mobile device as some parcel recipients may not possess or may not want to use a mobile device for operating a compartment. A parcel recipient may also possess a mobile device, which does not carry a short distance wireless communication capability, or may not want to activate it. It is therefore necessary that the parcel locker system of the invention can be operated by a parcel recipient both remotely with a mobile device and manually for example with a lock interface such as a pin-pad for entering a unique authorization code. However, automatically accessing a parcel locker with a mobile device is a primary objective of the invention, while manually accessing the parcel locker is a palliative procedure. Operating the parcel locker with the mobile device provides a superior user experience as entering an authorization code is not required. In this preferred mode object of the invention, access authorization by a compartments cluster is given by checking the authenticator automatically provided by the recipient mobile device and initially generated by the remote shipping system.

In order to support the palliative procedure for manual access, an authorization code is systematically provided to each recipient. For security reason, the authorization code provided to the recipient for picking-up a parcel is preferably a one-time authorization code, uniquely associated with the particular parcel to be picked-up, so that the one-time authorization code cannot be used again. One-time authorization codes are generated and managed by the remote shipping system. For each parcel to be picked-up from a compartment, a one-time authorization code needs to be provided to a compartments cluster comprising that compartment before the recipient comes for picking-up his parcel. In an embodiment, the authorization code is requested by the carrier agent MPL application at the time of the parcel delivery by a carrier agent after the parcel for deposit has been identified, for example by scanning a parcel identification attached onto the parcel. Alternatively, in another embodiment, the authorization code is generated beforehand by the remote shipping system and communicated to the MPL application for temporary storage before or when the carrier agent plans for his daily delivery into parcel lockers. Therefore, the carrier agent can operate the parcel locker even if he stands in an area not covered by long distance wireless communication.

Upon receiving an authorization code request, the remote shipping system generates the authorization code, which is temporarily duplicated into the mobile device. Once the parcel is deposited, the authorization code is transferred from the mobile device to the compartments cluster and associated with the compartment (i.e. compartment index) of the compartments cluster where the parcel has been deposited and the remote shipping system is informed of the deposit via the upload of the compartments cluster events. Then, the remote shipping system notifies the recipient for example via a SMS or an email that he has to pick-up a parcel. If the recipient does not have a MPL application installed, the notification provides the recipient with the parcel locker location and with the compartment identifier $140j$ and with the authorization code that he needs to enter for opening the compartment. If the recipient has installed the MPL application, the notification only informs the recipient of the parcel locker location and reminds him that he should use the MPL application for opening the compartment.

More generally, the benefit of operating a parcel locker with a mobile device also applies to any user including site owners or carrier agents. Access authorization by a compartments cluster is given by checking the authenticator automatically provided by the user mobile device and initially generated by the remote shipping system, thus replacing a manual authorization entry for example via a keypad or via a barcode scanning.

In addition to responding to the needs for a new generation of parcel lockers as described previously, the autonomous compartments clusters of the invention provide additional benefits. If a compartments cluster locking module malfunctions, and in particular cannot communicate anymore, all the other compartments clusters can continue to be operated and can communicate, unlike with prior art parcel lockers where a malfunctioning central control unit would block the operation of the whole parcel locker and would require immediate intervention. For the parcel locker of the invention, a simple swap of the malfunctioning compartments cluster could be performed at the most appropriate time. Another user benefit of the invention is that each user operates the compartments clusters of the invention with his own mobile device therefore allowing several users to access several compartments clusters in parallel. During busy periods, several recipients may pick-up their parcels in parallel or even carrier agents and recipients may interact in parallel with the parcel locker compartments clusters. Such parallel operations are made possible by the system architecture of the invention providing locking modules, which broadcast short messages, which store operation events and which update the PL configuration information of mobile devices and of the remote shipping system.

Figure 4:
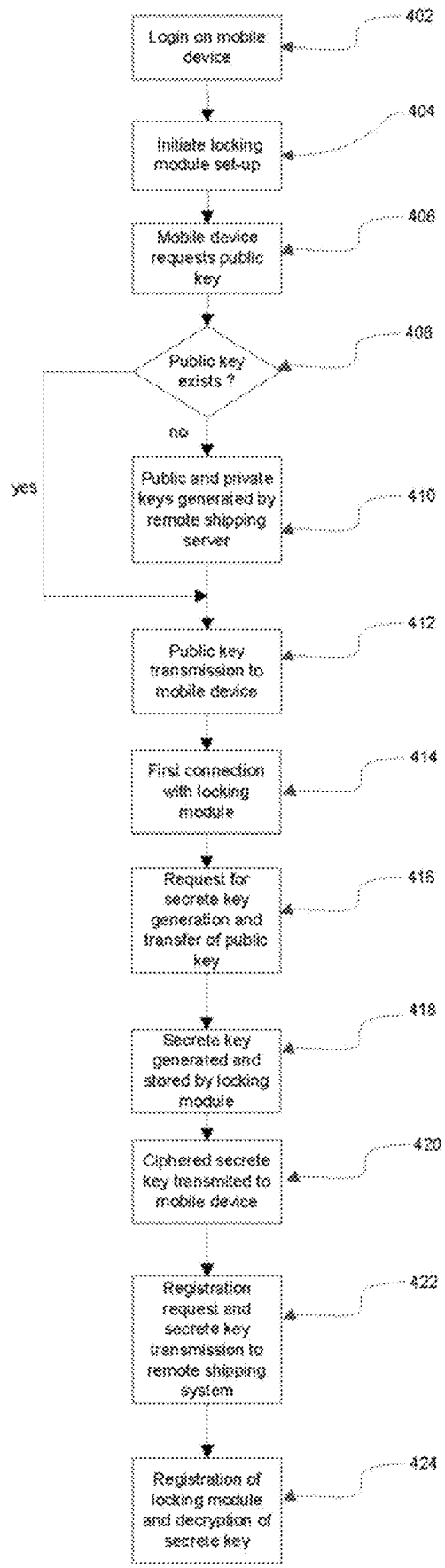
FIG. 4 illustrates a process according to an embodiment of the invention for setting up a locking module.

FIG. 4 illustrates an embodiment of the invention for the set-up of a locking module. The primary objective of the set-up is to ensure a confidential and secure transfer of secret keys for ciphering and deciphering data exchanged between a remote shipping system 106 and a locking modules 120*i* of a parcel locker, and in particular for ciphering and deciphering authenticators. According to the invention, the set-up can be performed via any mobile device such as a smartphone or a PDA, and therefore could take place anywhere including on site in a location where a parcel locker is installed. However, when the set-up is performed in a warehouse or in a customization centre, typically just before the final shipment before installation on site, the set-up can also be performed via a stationary computerized device, such as a PC or a laptop, having some short distance wireless communication capabilities compatible with the short distance communication capabilities of the locking modules. The MPL application installed on the mobile device (or stationary computerized device) is instantiated according to the user category having the credentials for performing a locking module set-up, and all functionalities for performing the set-up are made available to the user on the mobile application. Preferably, the user is guided through a wizard program for performing the set-up, which may cover all the locking modules of the parcel locker.

In step 402, a user initiates a locking module set-up by performing a login on a mobile device for accessing the MPL application functionalities required for a set-up. The login procedure requires the capture of the user credentials, which may include a user identification and/or a user personal password, and which may be captured via any means known in the art such as a manual entry via the mobile device interface (for example by keying the identifier on the keypad or touchscreen of the mobile device), an identification barcode reading by the mobile device or an identification capture by the mobile device via imaging or biometry technology or radio frequency technology. The mobile application sends a login request comprising the user credentials to the remote shipping system. After validating the login request, and in particular the user credentials, based on credentials stored in a database system 130, the remote shipping system grants access to the MPL application set-up functionalities on the mobile device for the user.

Following on the login, the MPL application is instantiated according to the user category and the user selects the set-up program for initiating the locking module set-up (step 404). The mobile device requests for a public key 152 to the remote shipping system for securing the transmission of a secret key 254 (step 406). If the remote shipping system has not yet generated a public key (step 408), the remote shipping system generates a couple of a public key 152 and of a corresponding private key 154, and stores and associates these public and private keys in a database 130 (step 410). These public and private keys are used for transferring the secret keys in a ciphered form from the locking modules to the remote shipping system. They may be regularly changed by the remote shipping system. For example, a new couple public and private keys may be generated for each parcel locker to be set-up. In step 412, the remote shipping system transmits the public key to the mobile device, which stores it temporarily. In step 414, the mobile device performs a first connection with the locking module. As soon as the mobile device receives a broadcasted short message from the locking module, which includes a unique cluster identification 250 associated with the locking module, the mobile device sends a request for establishing a first connection with the locking module. This first connection request does not comprise any authenticator and is authorized if no secret key is stored in a non-volatile memory 240 of the locking module. After validating the first connection request, the locking module establishes with the mobile device a short distance wireless communication. Then, the mobile device requests the locking module for the generation of a secret key and transfers the public key (step 416). Preferably, the request for the secret key generation and the transfer of the public key are included within the same request to minimize the number of exchanges and so that no check may have to be performed on whether the public key has been transmitted. The secret key generation request is the only request with the first connection request which may be authorized without comprising an authenticator. After validating the secret key generation request, by checking that no secret key is yet stored in the non-volatile memory 240 of the locking module, the locking module generates a preferably unique secret key 254 and stores it locally in a non-volatile memory 240 (step 418). The secret key may be randomly generated by the cryptographic module 256 with a very low probability of similitude with keys randomly generated by other locking modules, and would therefore be essentially unique. In such a case, the remote shipping system may check on similitudes and instruct a change of some secret keys to ensure for the unicity of the secret keys. Preferably, the locking module comprises a cryptographic module generating a random and unique secret key. In a preferred embodiment, the locking module stores the secret key in a ciphered form. In step 420, the locking module ciphers the secret key with the public key and transmits the ciphered secret key to the mobile device.

In step 422, the mobile device sends a request to the remote shipping system for the registration of the locking module and transmits the secret key in a ciphered form. Thereby, the generation of the secret key is secured and confidential and the secret key is transferred securely and confidentially via the mobile device. After validating the registration request, in particular by checking that no secret key is stored yet in a database system 130 of the remote shipping server for that particular locking module, the remote shipping system deciphers the transmitted ciphered secret key with the private key and registers the locking module (step 424). As part of the registration, the remote shipping system stores the secret key as a cluster secret key 136*i*, preferably in a ciphered form, and associates the cluster secret key with the locking module (i.e. with the unique cluster identification 134*i*) in the database 130 so that it can later be used for ciphering data to be transmitted to the locking module, and in particular for ciphering authenticators, and for deciphering data received from the locking module.

After the first connection to the locking module and after the secret key transmission, any new request from a mobile device to the locking module requires the inclusion of an authenticator generated by the remote shipping system and ciphered with the cluster secret key corresponding to the locking module. The inclusion of an authenticator with each request, in addition to securing the communication, also prevents the locking module to have to store the authenticator as it is provided with each request addressed to the locking module. In particular, if a generation of a new secret key is required (for security reasons for example), the request addressed to the locking module shall include an authenticator ciphered with the cluster secret key currently associated with the locking module.

During the setup procedure, after the secret key transmission, other parameters are transferred from the remote shipping server to the locking module such as the disconnection time-out 258 or a cluster broadcasting table 272. This transmission may be performed via a request including an authenticator. The disconnection time-out is configured on the remote shipping server before the set-up and may be set between 30 seconds and 30 minutes, and typically 5 minutes should be a maximum. If required, the disconnection time-out may later on be changed via an instruction sent by the remote shipping server to the locking module through a mobile device.

Figure 5:
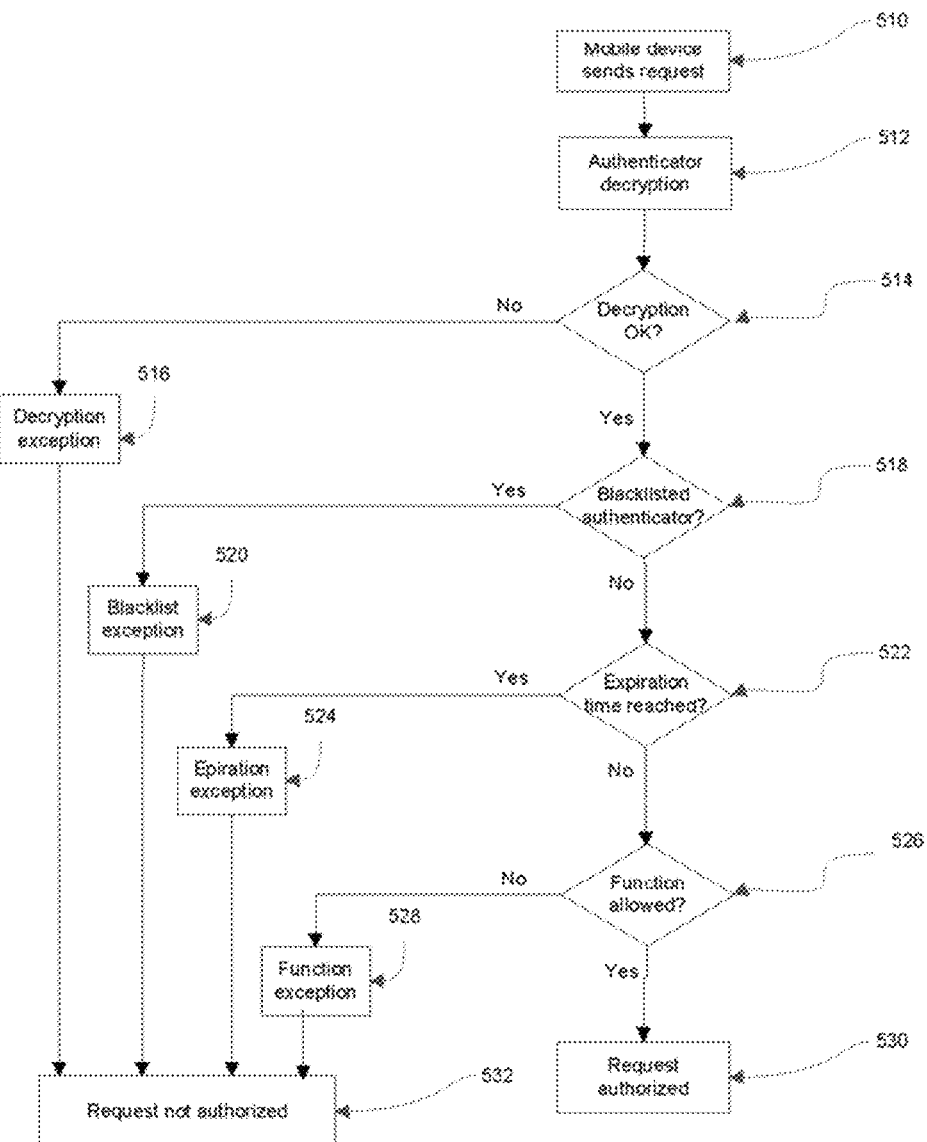
FIG. 5 illustrates a process according to an embodiment of the invention for validating a request from a mobile module by a locking module.

FIG. 5 illustrates an embodiment of the invention for the validation of a request from a mobile module by a locking module. Each time a mobile device sends a request to a locking module of a parcel locker, the following steps are applied for securing the communication with the locking module and the access to a compartment of the parcel locker. This process is applied in particular in the case of a request from the mobile device for establishing a communication with the locking module.

Once the registration of a locking module is completed, any request from a mobile device to the locking module shall be preceded by a login of the mobile device onto the remote shipping system for requesting and receiving at least one authenticator for establishing a short distance wireless communication with the locking module. The request including an authenticator 300 ciphered with a cluster secret key 136*i* corresponding, preferably uniquely, to the locking module is sent by the mobile device to the locking module (step 510). The request is associated with a function (or group of functions) supported by the locking module, and the function (or group of functions) is carried on by the locking module once the request is validated. Preferably, the request corresponds to only one function so as to minimize code complexity within the locking module or minimize the size of the request. However, depending on the carrier processes and on the parcel locker system configuration, grouping several functions within a request may be required for minimizing the number of exchanges. The authenticator includes a compartment index 310, a privileges mask 312 defining the user rights regarding the locking module, an expiration time 314 and a unique authenticator identification 316. In step 512, the locking module deciphers the authenticator with a secret key 254 matching the cluster secret key used by the remote shipping system for ciphering the authenticator. A positive check on this deciphering is the first step for authorizing the request (step 514). This first check is preferably performed by validating the format and content of the deciphered authenticator. Such a method ensures for a minimal size of the authenticator and of the request. Alternatively, this first check may be performed by identifying a cryptographic salt included in the ciphered authenticator or by comparing a signature, such as a hash, attached to the authenticator with a signature calculated based on the deciphered authenticator by a cryptographic algorithm installed in the locking module and corresponding to a cryptographic algorithm installed in the remote shipping server and having ciphered the hash attached to the authenticator. However, these methods result in a request of larger size. In case of a negative check on the deciphering, the locking module returns a deciphering exception message to the mobile device (step 516). The authorization is based on a successful deciphering of the authenticator with the cluster secret key corresponding to the particular locking module, and no specific validation code is required to be provided by the mobile device. In step 518, the locking module checks whether the authenticator identification 316 matches with an authenticator identification stored in a blacklist 256. In case of match (i.e. the authenticator is blacklisted), the locking module returns a blacklist exception message to the mobile device (step 520). If the authenticator is not blacklisted, the locking module proceeds with step 522 where the expiration time 314 is checked. If the expiration time has been reached, then the authenticator is not valid anymore, and the locking module returns an expiration exception message to the mobile device (step 524). Otherwise, the locking module proceeds with step 526 where the locking module verifies whether the function (or group of functions) targeted by the request is allowed for the user. The locking module identifies the function (or group of functions) targeted by the request within a function table 260 and checks whether the function (or group of functions) are authorized by the privileges mask 312. If the function (or group of functions) is not authorized by the privileges mask, the locking module returns a function exception message to the mobile device (step 528). Otherwise, the locking module authorizes the request and proceeds according to the request (step 530). Whenever any of the above exceptions occurs, the request is not authorized by the locking module (step 532).

The above checks on the expiration time or on the blacklist or on the privileges can be performed in any order.

In the case a new authenticator is required for each request, after the completion of the request, the locking module stores the authenticator identification and associated expiration time of the currently used authenticator in the blacklist. However, in order to minimize the number of generated authenticators, the same authenticator may be used for all the requests within a communication session. In this case, the storage of the authenticator identification and associated expiration time in the blacklist is performed by the locking module following on a disconnection request from the mobile device. In case of unintentional disconnection of the short distance wireless communication between the mobile device and the locking module, the authenticator identification and associated expiration time of the latest authenticator being used are stored in the blacklist after a disconnection time-out 258 has been reached. Preferably, in case of unintentional disconnection and in order to minimize the number of generated authenticators, before the disconnection time-out 258 is reached, the mobile device can use the same authenticator for re-establishing a connection with the locking module. A count-down for reaching the disconnection time-out starts after the latest request received by the locking module, i.e. the count-down is re-started after every validated request received by the locking module.

In a particular embodiment of the invention, a mobile device may be provided locally next to a parcel locker. This local mobile device may be used by all users for operating the parcel locker. It may in particular be used by parcel recipients without any smartphone or any carrier agent having a dis-functional mobile device. The local mobile device may also be used by carrier organizations, which may not want to integrate an MPL application, either temporarily or permanently, in the mobile devices that they use for delivering parcels. An MPL application is installed in the local mobile device, eventually via a download from a remote server at the time of the on-site installation of the parcel locker, and is instantiated according to a user category when a user logs onto the local mobile device. The local mobile device may be operated in parallel with a network of mobile devices as previously described or may simple replace the network of mobile devices for some applications. In one embodiment, the local mobile device is fixedly mounted on a pedestal next to the parcel locker or on a bracket attached to a wall next to the parcel locker or directly attached onto a compartments cluster of the parcel locker. The local mobile device may be powered with similar autonomous means as the locking modules. For some applications, the local mobile device may be connected to a local electrical network when it is made available. However, the compartments cluster would remain autonomous for easily installing parcel lockers and easily swapping compartments or for easily upgrading or changing the parcel lockers configuration on site. Eventually, a local mobile device may operate several parcel lockers located in the same area. In a preferred embodiment, the local mobile device may be retro-fitted on existing parcel locker supporting short distance communication capabilities.

The parcel locker system and methods of the invention described above comprise parcel lockers constituted of autonomous compartments clusters assembled together. However, it is easily understood by those skilled in the art that, in another embodiment of the invention, a single compartments cluster may be used by itself in a standalone configuration without being assembled as part of a parcel locker or even a single compartment—i.e. a single compartments cluster comprising a single compartment—may be used by itself in a standalone configuration. Such single standalone compartments clusters or single standalone compartments may be used for home delivery or for single point delivery systems. It can also be easily understood by those skilled in the art that, in another embodiment of the invention, compartments clusters could be reduced to single compartments with their own locking modules and assembled as part of a parcel locker. Such architecture would not benefit from the cost reduction of using a single locking module for several compartments assembled into a cluster, but it would provide a more modular and more flexible solution.

The invention claimed is:

1. An electronic locker system for parcel deposit and pick-up, comprising:
   a remote shipping system,
   at least one mobile device communicating via a long distance communication network with said remote shipping system,
   at least one parcel locker constituted of at least one autonomous compartments cluster including at least one compartment equipped with a door and including a locking module, which electronically controls locking and unlocking of said door and communicates locally with said at least one mobile device via a short distance communication ,wherein said locking module comprises:
   an energy management module configured for managing transitions of energy modes and allowing said at least one autonomous compartments cluster to be run in a sleep mode,
   a radio transceiver module equipped with an antenna,
   at least one processor configured for, while in said sleep mode, regularly emitting with said radio transceiver module a broadcasted short message towards said at least one mobile device for establishing a short distance communication session with said at least one mobile device,
   a cryptographic module configured for deciphering with a secret key stored in a non-volatile memory an authenticator generated and encrypted by said remote shipping system and included in a request sent by said at least one mobile device, and
   wherein said locking module includes in said non-volatile memory a functions table comprising functions available for said at least one autonomous compartments cluster and which can be run by said at least one processor, and said authenticator includes a privileges mask identifying functions authorized for operating said at least one autonomous compartments cluster amongst functions within said functions table, wherein said privileges mask consists in a series of bits wherein a bit of said series of bits corresponds to a function of said functions table and a value of said bit indicates whether said function is authorized or not authorized.

2. The system according to claim 1, wherein said locking module is configured for generating said secret key, preferably in a unique or an essentially unique form, with said cryptographic module and for storing said secret key in said non-volatile memory, wherein said locking module is configured for an automatic validation of said request based on said deciphering said authenticator wherein no authorization code is generated and provided to said locking module for said automatic validation.

3. The system according to claim 1, wherein said remote shipping system is configured for receiving and storing credentials of a user of said at least one parcel locker and for generating said authenticator and for generating said privileges mask based on said credentials.

4. The system according to claim 3, wherein said authenticator includes an expiration time limiting a validity duration of said authenticator and an authenticator identification generated by said remote shipping system, and said locking module includes in said non-volatile memory a blacklist comprising an authenticator identification associated with an expiration time matching with said authenticator identification and said expiration time of said authenticator when a disconnection request from said at least one mobile device has occurred or when a disconnection time-out has been reached following on an unintentional disconnection of said short distance wireless communication between said at least one mobile device and said locking module.

5. The system according to claim 4, wherein said locking module includes in said non-volatile memory a blacklist comprising an authenticator identification associated with an expiration time matching with said authenticator identification and said expiration time of said authenticator when said request is validated.

6. The system according to claim 1, wherein said cryptographic module is configured for ciphering said secret key with a public key and for ciphering with said secret key data to transfer to said remote shipping system via said at least one mobile device and is equipped with a symmetric Advanced Encryption Standard (AES) algorithm for generating and managing said secret key, and is equipped with an RSA 2018 asymmetric encryption algorithm or an Elliptic Curve Digital Signature Algorithm (ECDSA) for deciphering messages with said public key, wherein said remote shipping system includes in a database a cluster secret key associated with said locking module and matching said secret key, and includes a remote cryptographic module and said public key and an associated private key are generated by said remote cryptographic module.

7. The system according to claim 6, wherein said broadcasted short message comprises a first unique cluster identification relative to said at least one autonomous compartments cluster and in that a request from said at least one mobile device for establishing a local communication with said locking module via said short distance communication includes said authenticator comprising or sent with a second unique cluster identification wherein said at least one processor is configured for checking for a match between said first unique cluster identification stored in said locking module and said second unique cluster identification.

8. The system according to claim 1, wherein said locking module comprises a lock interface and an authorization code uniquely associated with a unique parcel identification corresponding to a parcel deposited in said at least one compartment so that a parcel recipient without a mobile device may pick-up a parcel by entering said authorization code via said lock interface wherein said remote shipping system is configured for generating and storing said authorization code and for transmitting said authorization code to said locking module via said at least one mobile device.

9. The system according to claim 1, wherein said at least one mobile device is fixedly mounted next to said at least one parcel locker or directly onto said at least one parcel locker and connected to a local electrical network and wherein said at least one processor comprises a high energy processor module, a low energy processor module and a very low energy processor module.

* * * * *